United States Patent [19]
Bienert et al.

[11] Patent Number: 6,101,785
[45] Date of Patent: Aug. 15, 2000

[54] DEVICE FOR SEALING CLOSURE CLIPS

[75] Inventors: Olaf Bienert, Waldems; Detlef Ebert, Bad Nauheim; Manfred Gerheim, Eschborn, all of Germany

[73] Assignee: Poly-Clip System GmbH & Co. KG, Frankfurt am Main, Germany

[21] Appl. No.: 09/144,924

[22] Filed: Sep. 1, 1998

[30] Foreign Application Priority Data

Sep. 2, 1997 [DE] Germany ............... 197 38 298

[51] Int. Cl.$^7$ ............... B65B 51/04; B65B 57/08

[52] U.S. Cl. ............... 53/138.4; 53/138.2; 53/52; 29/753

[58] Field of Search ............... 53/138.4, 138.3, 53/138.2, 52, 417; 100/30; 29/753, 755, 243.56; 227/2, 4, 5, 155; 493/215, 214, 210

[56] References Cited

U.S. PATENT DOCUMENTS 4,916,810  4/1990  Yeomans ............... 29/753
5,197,186  3/1993  Strong et al. ............... 29/753

*Primary Examiner*—Peter Vo
*Assistant Examiner*—Louis R. Huynh
*Attorney, Agent, or Firm*—Norris, McLaughlin & Marcus, P.A.

[57] ABSTRACT

Method and device for sealing closure clips between a stamp and a bottom tool, wherein the sealing distance between stamp and bottom tool is monitored by a sensor.

4 Claims, 2 Drawing Sheets

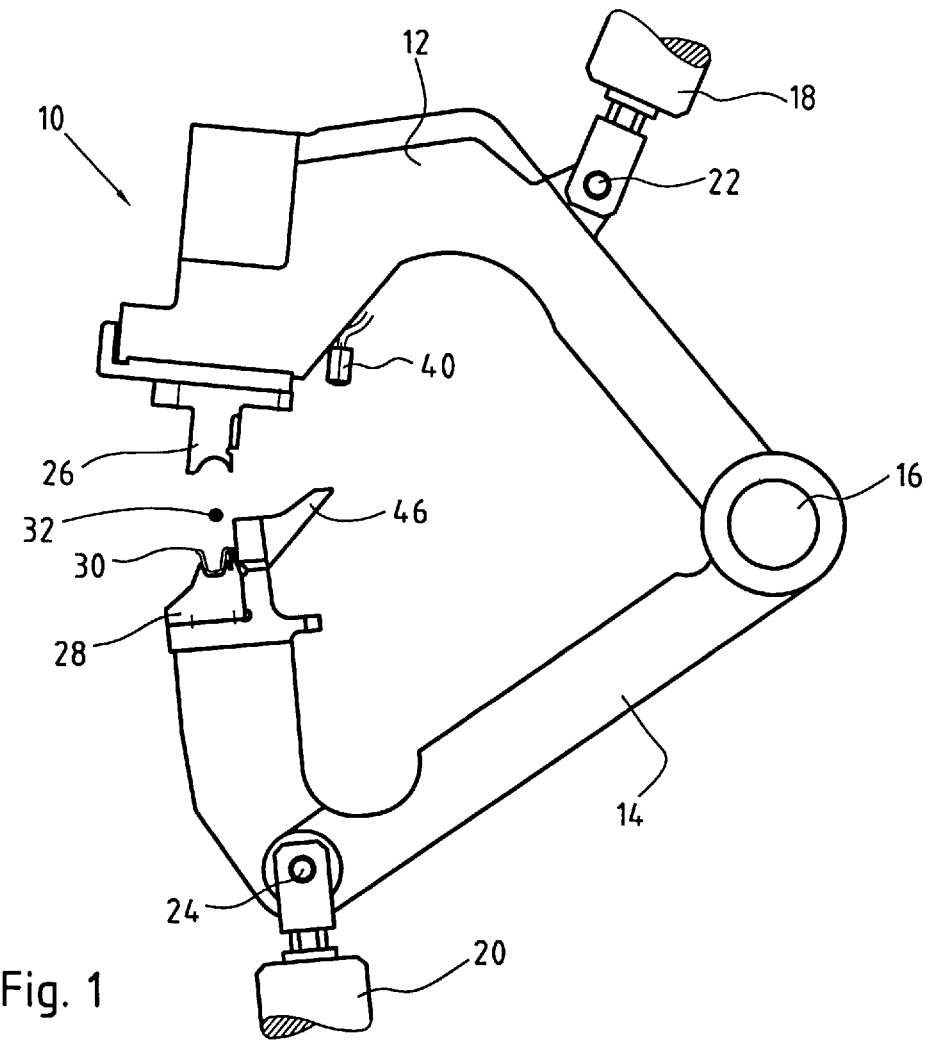
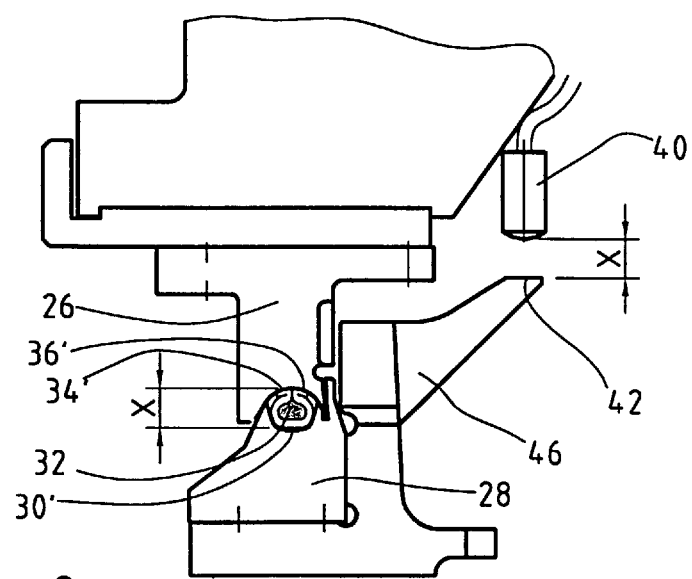

DEVICE FOR SEALING CLOSURE CLIPS

This invention relates to a method of setting up a machine for sealing closure clips between a stamp and a bottom tool, which for sealing the clip are first of all moved towards each other up to an adjustable sealing distance and are then moved away from each other. The invention also relates to a device for sealing closure clips between a stamp and a bottom tool.

BACKGROUND OF THE INVENTION

One application for methods as stated above and the corresponding device is the sealing of bag-shaped or tubular packages, such as for instance sausages. These are frequently sealed with U-shaped closure clips made of aluminum. High demands are made on the quality of such closure. It should not be so tight that the packaging casing is damaged when sealing the same. At the same time, however, the closure should be sufficiently tight, and during processing steps subsequent to the sealing of a sausage should not slip off the same. Due to these high demands made on the closure, the extent to which the clip is compressed upon completion of the sealing operation—subsequently referred to as clip height—must precisely be achieved for the respective type of package by adjusting a corresponding sealing distance. This is first of all effected empirically. Once the corresponding parameters for a type of product have been defined, they can be adjusted on the sealing machine. In the commercially available sealing machines it is generally possible to adjust the desired sealing distance. In most cases, a scale is provided, which provides for adjusting the same value for the clip height at a later date. Such sealing machine in the form of a desk top unit is known from DE-GM 19 33 066.

When the sealing machine has been adjusted to the corresponding product, the sealing operation is performed as follows:

First of all, a portion of a tubular casing is filled with the filling—for instance sausage meat. Subsequently, the filled sausage casing is pinched by two pairs of displacement shears. The same will then move away from each other axially with respect to the axis of the sausage and thus form a casing neck free from meat, which is disposed between the stamp and the bottom tool of the sealing machine. In the bottom tool, an open closure clip has been inserted. For sealing the closure clip, stamp and bottom tool are moved towards each other, so that the casing neck free from meat is seized by the open closure clip. Subsequently, the stamp impinges on the free legs of the U-shaped closure clip, bending the same about the casing neck. For sealing the casing neck, stamp and bottom tool first of all move towards each other, where they seal the closure clip and subsequently move away from each other, in order to release the closure clip. At the turning point of their movement, stamp and bottom tool have a sealing distance from each other which is decisive for the resulting clip height. The clip height of a sealed closure clip thus results from the actual sealing distance of stamp and bottom tool at the turning point between their movements towards each other and away from each other.

Since the system of levers moving stamp and bottom tool applies forces up to 2000 kg during the sealing operation, there will necessarily occur a certain wear. The resulting clearance is not considered when setting the sealing distance by means of the scale on the sealing machine. The consequence is that the scale reading does not correspond with the actual sealing distance and accordingly not with the actually resulting clip height either. Thus, the actually resulting clip height is not the originally determined desired clip height for which the sealing distance has been adjusted on the scale. Even during a current production, the wear caused by the clearance of the system of levers leads to the fact that the sealing distance of stamp and bottom tool is constantly increasing, so that the closure clips are sealed less and less tight and for instance during the subsequent processing of a sausage may slip off the same.

Accordingly, the users of such sealing machines are forced nowadays to newly check and possibly correct the tightness of the closure with each production start. However, the testing methods are quite specific and depend on the tester and thus are very subjective. The closure clip height very frequently lies below the required height for safety reasons, i.e. the closure clips are sealed too tight. As a result, the sealing machine is subjected to a much higher mechanical load than would actually be necessary, which leads to an increased wear and thus an early failure of the machine.

SUMMARY OF THE INVENTION

It is the object of the invention to be able to monitor the sealing distance independent of subjective influences. This object is solved by a method as stated above, where the sealing distance between stamp and bottom tool is detected by means of a sensor.

The gist of the invention consists in detecting the closure clip height actually obtained in operation as a result of the wear of bearings, etc. In accordance with the invention this is advantageously effected by measuring the sealing distance between stamp and bottom tool. This is based on the knowledge that the sealing distance between stamp and bottom tool is finally decisive for the quality of the closure. By indirectly measuring the sealing distance, all influences determining the sealing distance are considered as well, whereas on the other hand influences distorting the measurement result are avoided.

It is also conceivable to directly measure or change the sealing distance, in that the maximum sealing force is detected by means of a sensor, as is proposed by EP 0,467,020 A1. However, this variant has the disadvantage that the measurement also includes the friction forces occurring upon sealing the clip and the deformation resistance of the closure clip. The friction forces would be changed for instance by using greasy closure clips instead of dry ones.

A further advantage of the inventive method consists in that the sealing machine can be switched off automatically when no or two closure clips are present between stamp and bottom tool. In such cases, the required clip height is not achieved at all or exceeded with a correctly adjusted machine.

What is preferred is a method where for determining the sealing distance there is measured the distance between a distance sensor fixedly allocated to the stamp or the bottom tool and a reference surface fixedly allocated to the respective other part (bottom tool or stamp). This measurement is preferably effected in a contactless way, in order to avoid a mechanical wear and an unnecessary formation of noise.

The sealing distance is readjusted when the measured sealing distance lies outside a range of desired values for the sealing distance. This is preferably effected automatically. There is obtained a closed loop for monitoring the closure clip height during the operation, by means of which expensive production losses due to incorrectly sealed packages or undesired interruptions for readjusting the closure clip height can be prevented.

The adjustment of the sealing distance between stamp and bottom tool is for instance effected, as is known from DE-GM 19 33 066, by changing the geometry of the stamp drive. This can particularly easily be effected in that the sealing distance is adjusted by changing the length of a lifting rod in the stamp drive.

The inventive solution of the object also consists in a device as stated above, which includes a sensor for detecting a sealing distance between stamp and bottom tool as well as a means for adjusting the sealing distance between stamp and bottom tool. With such a device it is possible to determine the closure clip height while avoiding all possible points of wear, and the user can thus benefit from all advantages of the method in accordance with the invention.

In a preferred embodiment of the device the sensor is fixedly mounted with respect to the bottom tool or the stamp and corresponds with a reference surface fixedly mounted with respect to the respective other part (stamp or bottom tool).

The sensor preferably is a non-contact distance sensor. There is thus obtained a particularly simple construction hardly susceptible to failure.

A preferred embodiment of the device includes a stamp drive, which has a longitudinally adjustable lifting rod. By means of this longitudinally adjustable lifting rod the clip height can be adjusted. The lifting rod can for instance be part of a lever mechanism which is driven by a cam plate and together with the same forms the drive mechanism for stamp and/or bottom tool. The line of movement of the stamp and/or the bottom tool can be predetermined by the shape of the cam plate.

The lifting rod is preferably equipped with a motor-driven actuator for the rod length. The actuator provides for an automatic adjustment of the rod length. When—as it is preferred—the distance sensor and the actuator are connected with each other by a control unit, there is obtained a closed loop for monitoring the clip height.

The invention and its variants will now be explained with reference to the drawings and examples.

BRIEF DESCRIPTION OF THE DRAWINGS

FIG. 1 represents a simplified sealing system of a sausage sealing machine,

FIG. 2 represents an embodiment with closed sealing tool and a sensor for scanning the height of the closure clip in an enlarged segment of the sealing system in accordance with FIG. 1.

DETAILED DESCRIPTION

Figure 3:
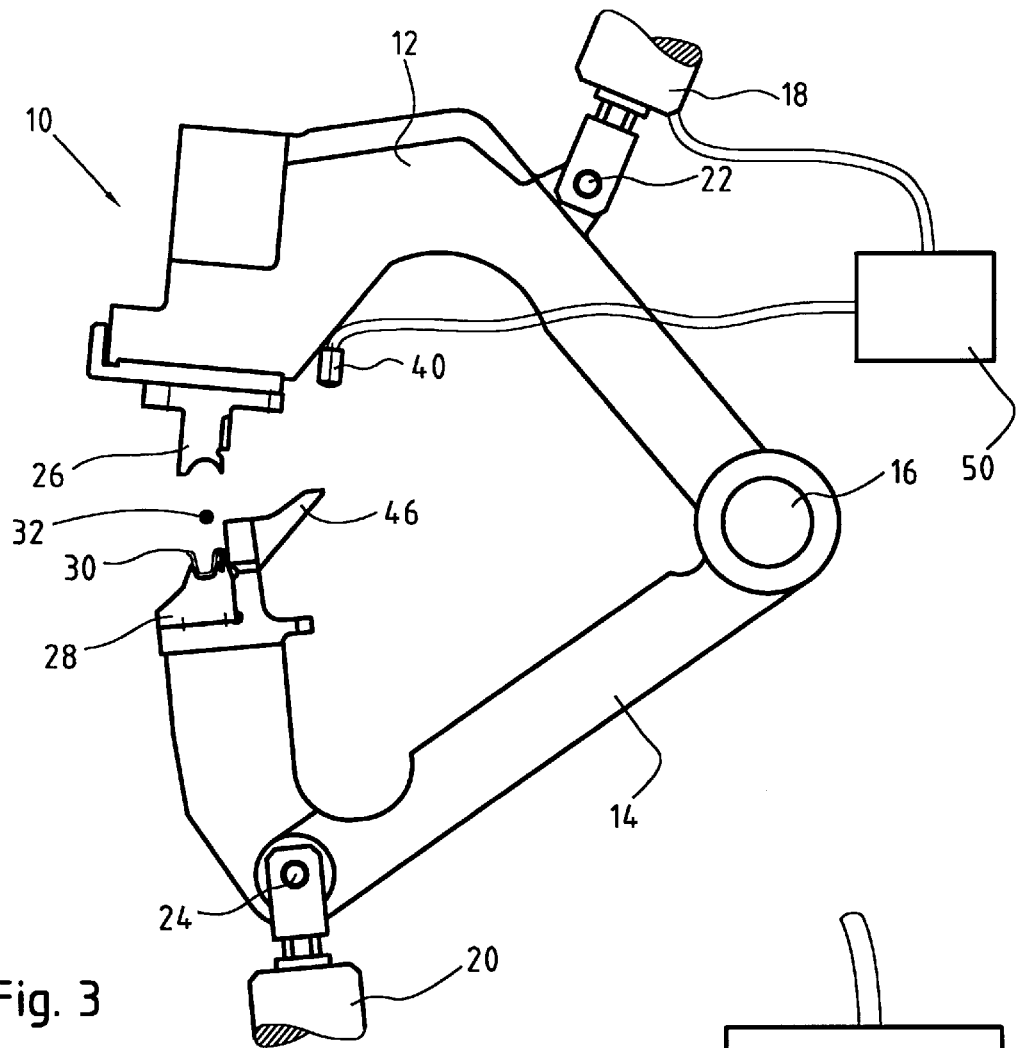
FIG. 3 represents the embodiment of FIG. 1 further comprising a motor-driven actuator.

The sealing system 10 of a sealing machine includes an upper sealing lever 12 and a lower sealing lever 14. Both sealing levers can be swivelled about a common pivot 16. The swivel movement of the sealing levers 12 and 14 is effected by a not represented cam plate and transmitted onto the same via lifting rods 18 and 20, which act upon pivots 22 and 24 at the sealing levers 12, 14. At the upper sealing lever 12 a stamp 26 is attached, and at the lower sealing lever 14 a bottom tool 28 is attached. Into the bottom tool 28 an open closure clip 30 has been inserted. Between the stamp 26 and the bottom tool 28 with the open closure clip 30 there is disposed a casing neck 32 to be sealed.

For sealing the same, the stamp 26 and the bottom tool 28 are moved towards each other by a corresponding swivel movement of the sealing levers 12 and 14, so that the casing neck 32 is seized by the open closure clip 30. Subsequently, the stamp impinges on the free legs of the U-shaped closure clip and bends the same about the casing neck 32. Upon sealing the closure clip 30, stamp 26 and bottom tool 28 are again moved away from each other, in order to release the casing neck 32 sealed with the closure clip. At the turning point of their movement, stamp 26 and bottom tool 28 have the smallest distance from each other, at which the closure clip has been fully compressed to the desired clip height.

This condition is shown in FIG. 2. The stamp 26 and the bottom tool 28 have a sealing distance from each other—designated with "X" in FIG. 2, which also corresponds to the clip height. The closure clip 30' has been deformed such that its free legs 34' and 36' are in contact with each other and safely enclose the casing neck 32. In addition, the closure clip 30' has been compressed to the desired clip height "X".

The clip height "X" is adjusted by changing the length of the lifting rod 18. For a repeated adjustment of the length of the lifting rod and thus of the clip height "X" to a certain value, a scale is provided on the sealing machine which is not represented in the Figures. When adjusting the clip height "X" by means of this scale, the clearance necessarily occurring for instance in the pivots 22 and 24 and in the pivot 16 is necessarily disregarded. To be able to nevertheless perform an exact adjustment of the clip height, a distance sensor 40 is fixedly mounted on the upper pivoted lever 12 with respect to the stamp 26. This distance sensor makes a contactless measurement of the distance from a reference surface 42 at the lower pivoted lever 14. The reference surface 42 is fixedly mounted with respect to the bottom tool 28. The reference surface 42 is part of a damping plate 46, which protrudes into the space covered by the sensor 40 such that the same provides distance values with a maximum possible accuracy. The shape of the damping plate 46 has been chosen accordingly. In the case of non-contact sensors, which respond to approaching metal particles, the damping plate 46 is preferably made of metal.

Instead of the sensor assembly described above and represented in the drawing, the sealing system might also include a force sensor for detecting the sealing force, as the same is increasing with decreasing clip height "X". However, the sealing force does not exclusively depend on the clip height "X", but for instance also on the sliding and deformation properties of the closure clip. With an otherwise identical type of closure clip, these properties in turn depend on whether the closure clips are dry or greasy for whatever reasons, so that the measurement of the sealing force does not allow an unambiguous conclusion as regards the clip height. Measuring the sealing distance between stamp 26 and bottom tool 28 therefore appears to be more appropriate for determining the actual closure clip height "X". Nevertheless, a sensor for detecting the sealing force may be provided in addition, in order to differentiate for instance between deviations of the actual clip height from the desired clip height, which are caused by the wear in the joints of the drive mechanism, and those resulting from the fact that possibly no closure clip 30 or even two of them have been inserted in the bottom tool 28.

Instead of the non-contact distance sensor described above and represented in the drawing, there may also be employed a hydraulically operating distance sensor. In this case, a cylinder is mounted at the upper sealing lever 12, in which cylinder there is disposed a piston with a piston rod which protrudes from the cylinder and by means of a reference surface at the lower sealing lever 14 can be pressed into the cylinder. The cylinder space above the piston is filled with a liquid, which is urged into a measuring tube when the piston rod is pressed into the cylinder. The measuring tube is provided with a scale indicating the clip height. Such a hydraulic measurement system, however, has the disadvantage that the zero point for the measurement is changed by the expansion of the liquid column and must therefore newly be adjusted before each measurement. Moreover, the levers move towards each other during the sealing operation with a speed of about 2 m/sec, so that damages or disturbing noise may occur when the same hit a measuring instrument. Therefore, the above-described contactless measurement system is preferred.

Figure 4:
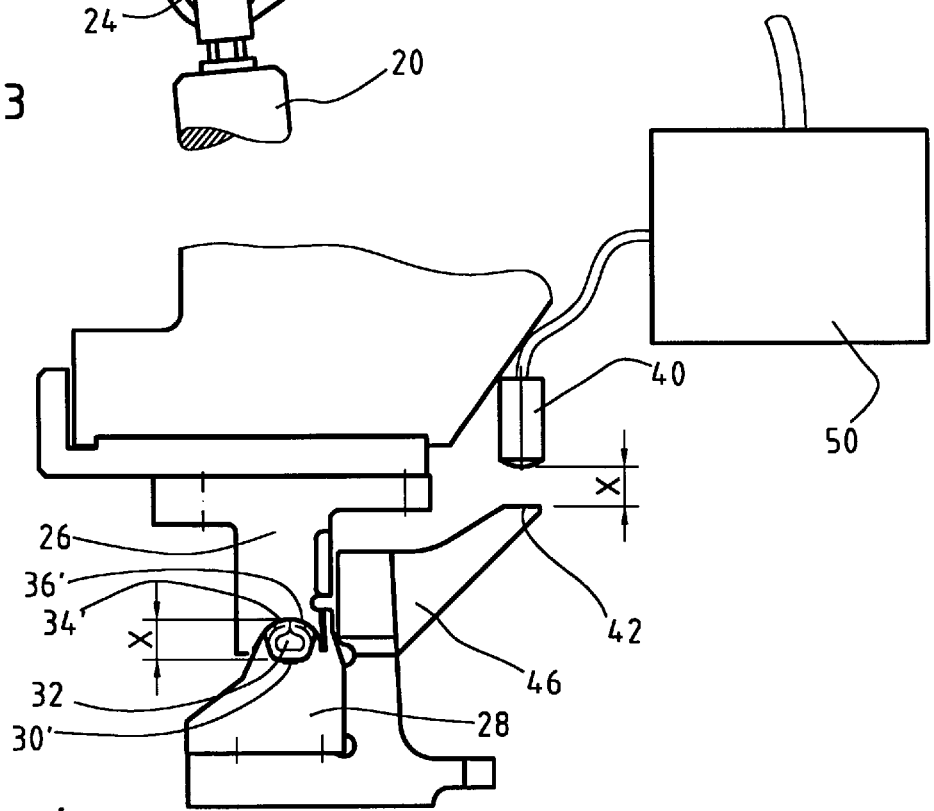
FIG. 4 represents the embodiment of FIG. 2 further comprising a motor-driven actuator.

The sealing system 10 represented in FIGS. 1 and 2 can also be completed such that the lifting rod 18 is equipped with a motor-driven actuator 50 (FIGS. 3 and 4). This actuator is operated by a control unit, in which the values for the actual clip height "X" determined by the sensor 40 are compared with desired values. By means of the control unit and the actuator, the clip height "X" can automatically be readjusted in the case of deviations from the standard. This control system can be completed by the above-described force sensor for detecting the sealing force. In any case, a sealing system is obtained, by means of which a high closure quality is achieved with little susceptibility to failure.

What is claimed is:

1. A device for sealing closure clips, comprising a bottom tool for holding said closure clips, a stamp, an upper sealing lever (12), a lower sealing lever (14) which sealing levers are swivelled about a common pivot (16), lifting rods (18, 20) attached to said sealing levers, said bottom tool being attached to said lower sealing lever, said stamp (26) being attached to said upper sealing lever, an adjustable and reversible actuator being connected to and acting upon one or both of said lifting rods for moving either of said bottom tool or said stamp towards or away from the other, a sensor for determining a distance between said bottom tool and said stamp, and a control unit connected to said sensor and said actuator whereby in operation said control unit automatically adjusts the operation of said actuator in accordance with the distance between said bottom tool and said stamp determined by said sensor to maintain said distance at a predetermined value.

2. The device of claim 1, wherein said distance sensor is fixedly attached to one of either the stamp or the bottom tool, and a reference surface is attached to the other of said stamp or bottom tool; and the sensor measures the distance between itself and said reference surface.

3. The device of claim 2, wherein said sensor is a non-contact sensor.

4. The device of claim 1, wherein said actuator is motor-driven.

* * * * *